(12) United States Patent
Jiang

(10) Patent No.: US 11,832,725 B2
(45) Date of Patent: Dec. 5, 2023

(54) HOLLOW FASION PANEL AND USAGE

(71) Applicant: Jinglei Jiang, Yuyao (CN)

(72) Inventor: Jinglei Jiang, Yuyao (CN)

( * ) Notice: Subject to any disclaimer, the term of this patent is extended or adjusted under 35 U.S.C. 154(b) by 0 days.

(21) Appl. No.: 17/630,163

(22) PCT Filed: Jul. 27, 2020

(86) PCT No.: PCT/CN2020/104792
§ 371 (c)(1),
(2) Date: Jan. 28, 2022

(87) PCT Pub. No.: WO2021/013263
PCT Pub. Date: Jan. 28, 2021

(65) Prior Publication Data
US 2022/0287462 A1    Sep. 15, 2022

(30) Foreign Application Priority Data

Jul. 25, 2019   (CN) .......................... 201910678593.X
Jul. 22, 2020   (CN) .......................... 202010711101.5
Jul. 22, 2020   (CN) .......................... 202021464785.5

(51) Int. Cl.
A47B 96/20    (2006.01)
A47B 13/08    (2006.01)
A47B 96/18    (2006.01)

(52) U.S. Cl.
CPC ............ *A47B 96/205* (2013.01); *A47B 13/08* (2013.01); *A47B 96/18* (2013.01)

(58) Field of Classification Search
CPC ............................... A47B 96/205; A47B 96/18
See application file for complete search history.

(56) References Cited

U.S. PATENT DOCUMENTS

2005/0103239 A1*  5/2005  Neunzert ................ F16B 12/24
                                                        108/132
2021/0022502 A1*  1/2021  Jiang ......................... B32B 3/30

* cited by examiner

*Primary Examiner* — Michael C Miggins

(57) ABSTRACT

A hollow fusion panel and usage. The hollow fusion panel comprises a first layer, a second layer, a first partial panel and a second partial panel; the first partial panel and the second partial panel form an integrally formed structure in an enclosed manner, the first layer overlaps with at least part of the second layer, multiple portions of the second partial panel arc all recessed towards a direction of the first partial panel to form a predetermined number of support structures which arc a distributed in a preset manner, each of the support structures forms a recessed cavity, the support structures and at least part of the first partial panel are fused and the occupied area of the first partial panel fused by a single support structure is s, and the thickness of the portion where the first A hollow fusion panel and application thereof is disclosed, wherein the hollow fusion panel includes a first layer, a second layer, a first panel member and a second panel member, wherein the first panel member and the second panel member are constructed to form a hollow integral structure. The first layer and the second layer are at least partially overlapped and composited such that a plurality portions of the second panel member are recessed in a direction toward the first panel member to form a predetermined number of supporting structures distributed in a predetermined manner, wherein each of the supporting structures forms a recessed cavity therein and is at least partially fused with the first panel member in such a manner that an area of the first panel member being fused and occupied by the corresponding supporting structure is s, and a thickness of a position where the first panel member fused with the second panel member is t, where $s/t^2$ is greater than 0.1.

21 Claims, 10 Drawing Sheets

HOLLOW FASION PANEL AND USAGE

BACKGROUND OF THE PRESENT INVENTION

Field of Invention

The present invention relates to the field of plastics, and more particularly to hollow fusion panel and its application.

Description of Related Arts

It is very common to use plastic to produce articles, such as plastic made furniture, toys and sports equipment.

Plastic manufacturing has many advantages that other materials cannot match, such as light weight, low cost, and easy shaping, while it also has some disadvantages, such as lower structural strength. In order to make up for the shortcomings of low structural strength of plastic products, designers generally design plastic products structurally, for example designing additional reinforcing ribs or using improved materials, so as to strengthen the strength of plastic products.

Additional reinforcing ribs usually increase the overall weight of the plastic product, and the reinforcing ribs are generally provided on the underside of the plastic product to bear load and weight. If the plastic product is a tabletop board, the ribs may adversely affect the installation of the table legs, because the ribs may occupy the installation locations of the table legs.

To strengthen the strength of plastic products by means of various material properties usually requires a higher cost. For example, for larger tabletop boards, they require more materials and higher manufacturing costs, resulting in difficult to promote the use. Moreover, it is currently difficult to find a perfect plastic material that overcome the above shortcomings thereof while maintaining the advantages of plastic.

At present, there is a kind of plastic product on the market, which has a hollow structure surrounded by upper and lower surfaces, wherein the lower surface and the upper surface are spaced apart and the lower surface extends toward the upper surface to support the upper surface. In this way, a plastic product with lighter weight and higher structural strength is provided. However, due to the performance limitation of the plastic itself, the structural strength of this kind of plastic product is still relatively low, and that the upper surface may collapse due to long load bearing times during long periods of use. Additionally, during the manufacturing process of this kind of plastic product, it is also necessary to pay attention to the spacing and separation of the upper and lower opposing surfaces that, if they are accidentally stuck together, it may cause uneven heat dissipation on the upper surface and produce defective products.

SUMMARY OF THE PRESENT INVENTION

In order to solve the above-mentioned technical problems of the conventional art, the present invention provides a technical solution for a blow-molded hollow fusion panel having a stable and strong structure while having good impact resistance and light in weight.

The present invention provides another technical solution for producing a compound structure of a double-layer blow-molded hollow fusion panel having a good impact resistance, strong and stable structure, but light weight.

The present invention provides another technical solution for producing a compound structure of a three-layer hollow fusion panel having a good impact resistance, strong and stable structure.

The present invention provides another technical solution for providing a blow-molded hollow fusion panel, comprising an upper panel member and a lower panel member, wherein the layer and the lower panel member are formed by blow-molding to form a hollow structure between the upper panel member and the lower panel member, and being characterized in that: each of the upper panel member and the lower panel member includes an outer layer and an inner layer, wherein the lower panel member has a predetermined number of portions of the lower panel member is recessed in a direction toward the upper panel member until the inner layer of the lower panel member is fused with the inner layer of the upper panel member to form a predetermined number of joint supporting structures respectively.

Preferably, each of the upper panel member and the lower panel member includes an outer layer, a intermediate layer and an inner layer, wherein the lower panel member has a predetermined number of portions of the lower panel member is recessed in a direction toward the upper panel member until the inner layer of the lower panel member is fused with the inner layer of the upper panel member to respectively form a predetermined number of joint supporting structures distributed in a predetermined manner.

In order to improve the strength of an edge structure of the hollow fusion panel, the upper panel member has an outer bending wall downwardly bent from an outer edge thereof, and the lower panel member has an inner bending wall downwardly bent from an outer edge thereof, wherein a bottom of the inner layer of the outer bending wall and a bottom of the inner layer of the inner bending wall are fused and integrated with each other.

In order to improve the structural strength of the hollow fusion panel, the joint supporting structure can be embodied a point structure or an elongated strip structure.

Preferably, at least one reinforcing rib is provided at the joint supporting structure.

Preferably, the joint supporting structure is constructed to have two reinforcing ribs and, correspondingly, three contact peak points which are arranged at intervals with the two reinforcing ribs.

The present invention provides another technical solution for providing the layer of the raw material structure of a double-layer blow-molded hollow fusion panel, wherein the outer layer of each of the upper panel member and the lower panel member are made of high density polyethylene, and the inner layer of the upper panel member and the lower panel member both use a mixture selected from high density polyethylene, metallocene polyethylene and calcium carbonate, or that both the upper panel member and the lower panel member use a mixture selected from high density polyethylene, metallocene polyethylene and glass fiber.

Preferably, for the inner layer, the mass percentage of the metallocene polyethylene is 10-15%, the mass percentage of the calcium carbonate is 15-20%, and the rest is high density polyethylene. Alternatively, the mass percentage of the metallocene polyethylene is 10-15%, the mass percentage of the glass fiber is 15-25%, and the rest is high density polyethylene.

The present invention provides another technical solution that: according to the compound material structure of a double-outer single-inner three-layer blow-molded hollow fusion panel of each of the upper panel members and lower panel members, the outer layers of the upper panel member and the lower panel member are both made of high density polyethylene, and the intermediate layers of the upper panel member and the lower panel member are both made of a mixture selected from high density polyethylene and calcium carbonate or a mixture of high density polyethylene and glass fiber, and the inner layers of the upper panel member and the lower panel member are both made of metallocene polyethylene.

In one preferred embodiment, for the intermediate layer, the mass percentage of high density polyethylene is 70-85% and the mass percentage of calcium carbonate is 15-30%.

In another preferred embodiment, for the intermediate layer, the mass percentage of high density polyethylene is 60-85% and the mass percentage of the glass fiber is 15-40%.

Compared with the conventional art, the advantage of the present invention is that the multi-layer blow-molded hollow fusion panel only utilizes the blow-molded hollow structure of the upper and lower panel members to construct a lightweight, rigid, and impact-resistant blow-molded panel structure, wherein a predetermined number of portions of the lower panel member is recessed in the direction toward the upper panel member until the inner layer of the lower panel member and the inner layer of the upper panel member are fused with each other to respectively form a predetermined number of joint supporting structures distributed in a predetermined manner to improve the structural strength of the blow-molded panel. The outer layer can be made of materials with high surface strength, scratch resistance and oil resistance. The inner layer can be made of materials with low thermoplastic shrinkage ratio to provide a frame support effect. When the intermediate layer is made of materials with high toughness, elasticity and energy absorption, the intermediate layer is able to provide a buffering effect to effectively alleviate the damage to the panel due to impact and drop, thereby further improving the overall structural strength of the blow-molded panel.

An advantage of the present invention is to provide a hollow fusion panel and application thereof, wherein the hollow fusion panel has a structure that has excellent properties, such as excellent structural strength performance while being manufactured to have a thinner thickness.

Another advantage of the present invention is to provide a hollow fusion panel and application thereof, wherein the hollow fusion panel includes a first panel member and a second panel member arranged opposing with each other correspondingly, wherein one or more portions of the second panel member extend toward the first panel member to be fused with one or more portions of the first panel member respectively to form a predetermined number of supporting structure, which can be conducive to enhancing the structural strength of the hollow fusion panel.

Another advantage of the present invention is to provide a hollow fusion panel and application thereof, wherein the fusion of the supporting structure and the first panel member enables a thickness of the entire hollow fusion panel can be reduced.

Another advantage of the present invention is to provide a hollow fusion panel and application thereof, wherein due to the fusion of the supporting structure and the first panel member, a thickness of the joint between the supporting structure and the first panel member can be smaller than the sum of the thickness of the supporting structure and the thickness of the first panel member. In other words, the thickness at this joint position can be reduced in comparison with the condition without or before the fusion, that facilitates heat dissipation during the manufacturing process.

Another advantage of the present invention is to provide a hollow fusion panel and application thereof, wherein the first panel member can be a double-layer or multi-layer structure, and the supporting structure can be fused with at least one layer of the first panel member, thereby facilitating a bonding strength of the first panel member and the second panel member.

Another advantage of the present invention is to provide a hollow fusion panel and application thereof. In the conventional art, a certain distance is required to be maintained between the first panel member and the second panel member to prevent unwanted occurrence of melting collapse at the surface of the first panel member caused due to incorrect contact between the first panel member and the second panel member. In the present invention, since the first panel member can be a double-layer or multi-layer structure, the choice of materials with different properties to manufacture the first panel member can minimize the occurrence of melting collapse that may be caused at the interconnection of the first panel member and the second panel member.

Another advantage of the present invention is to provide a hollow fusion panel and application thereof. In the conventional art, any possible contact area between the first panel member and the second panel member should be reduced as much as possible in order to reduce the occurrence of melting collapse caused by uneven heat dissipation due to the thicker thickness of the contacting position. In the present invention, since the first panel member and the second panel member of the hollow fusion panel can be fused at the joint position thereof, a thickness at such contacting position is reduced, thereby reducing the possibility of melting collapse occurrence.

According to one aspect of the present invention, the present invention provides a hollow fusion panel, which includes:

a first layer;
a second layer;
a first panel member; and
a second panel member, wherein at least a portion of the first panel member and at least a portion of the second panel member are configured to have a predetermined distance to define and form at least one cavity therebetween, such that the first panel member and the second panel member are surroundingly constructed to form a hollow integral structure, wherein the first layer and the second layer are at least partially overlapped and composited, the first panel member including one or two selected from at least a portion of the first layer, at least a portion of the second layer and at least a combining portion of at least a portion of the first layer and at least a portion of the second layer, the second panel member including one or two selected from at least a portion of the first layer, at least a portion of the second layer and at least a combining portion of at least a portion the first layer and at least a portion the second layer, wherein a plurality of portions of the second panel member is recessed in a direction toward the first panel member to form a predetermined number of supporting structures distributed in a predetermined manner, wherein each of the supporting structures forms a recessed cavity, wherein a plurality of the supporting structures and the first panel member are at least partially fused, such that a fusing area of the first panel member being fused and occupied by a corresponding supporting structure of the predetermined number of supporting structures is s and a thickness of the portion of the first panel member respective to the second panel member opposing arranged is t, where $s/t^2$ is greater than 0.1.

According to one embodiment of the present invention, each of the supporting structures is provided with at least one reinforcing rib which is positioned in the recessed cavity and extended integrally with the supporting structure.

According to one embodiment of the present invention, the second panel member extends toward the cavity to form at least one contact peak point, wherein each contact peak point is recessed in a direction toward the first panel member until being connected with the first panel member.

According to one embodiment of the present invention, the reinforcing rib is a U-shape wave-like structure formed from at least portion of the corresponding supporting structure protruding and extending toward the first panel member, wherein the reinforcing rib is transversally extended across a bottom of the recessed cavity to form at least one contact peak point correspondingly, and the contact peak point is recessed toward the first panel member until connecting with the first panel member.

According to another aspect of the present invention, the present invention provides a hollow fusion panel, which includes:

a first layer;

a second layer;

a first panel member; and a second panel member, wherein at least a portion of the first panel member and at least a portion of the second panel member are configured to have a predetermined distance to define and form at least one cavity therebetween, such that the first panel member and the second panel member are surroundingly constructed to form a hollow integral structure, wherein the first layer and the second layer are at least partially overlapped and composited, the first panel member including one or two selected from at least a portion of the first layer, at least a portion of the second layer and at least a combining portion of at least a portion of the first layer and at least a portion of the second layer, the second panel member including one or two selected from at least a portion of the first layer, at least a portion of the second layer and at least a combining portion of at least a portion the first layer and at least a portion the second layer, wherein the second panel member is recessed in a direction toward at least portion of the first panel member to form at least one contact peak point, such that a fusing area of the first panel member being fused and occupied by the at least one contact peak point is s and a thickness of the portion of the first panel member respective to the second panel member opposing arranged is t, where $s/t^2$ is greater than 0.1.

According to one embodiment of the present invention, multiple portions of the second panel member are recessed toward the first panel member to form a predetermined number of supporting structures distributed in a predetermined manner, wherein each of the supporting structures forms a recessed cavity.

According to one embodiment of the present invention, each of the supporting structures is provided with at least one reinforcing rib positioned in the recessed cavity and integrally extended with the supporting structure.

DETAILED DESCRIPTION OF THE PREFERRED EMBODIMENT

Figure 1:
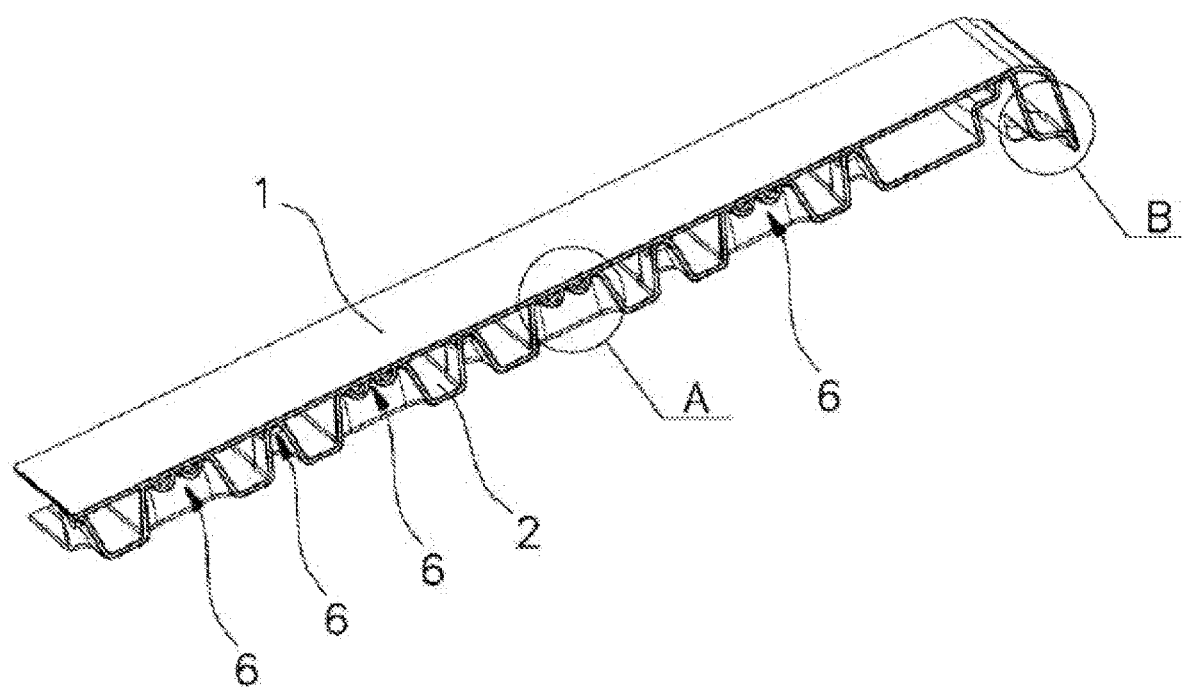
FIG. 1 is a partial sectional perspective view of a preferred embodiment of the present invention.

The following description is used to disclose the present invention so that those skilled in the art can implement the present invention. The preferred embodiments in the following description are merely examples, and those skilled in the art can think of other obvious variations. The basic principles of the present invention defined in the following description can be applied to other embodiments, modifications, improvements, equivalents, and other technical solutions that do not depart from the spirit and scope of the present invention.

Those skilled in the art should understand that in the disclosure of the present invention, the terms of the orientation or positional relationship indicated by "longitudinal", "lateral", "upper", "lower", "front", "rear", "left", "right", "vertical", "horizontal", "top", "bottom", "inner", "outer", etc. are based on the orientation or positional relationship shown in the drawings, which is only for the convenience of describing the present invention and simplifying the description, rather than indicating or implying that the device or element referred to must have a specific orientation, be constructed and operated in a specific orientation, so the above terms should not be understood as limiting the present invention.

It can be understood that the structure disclosed according to the present invention may have other suitable shapes, sizes, configurations, arrangements and features. It can be understood that the term "a" should be understood as "at least one" or "one or more", that is, in one embodiment, the number of an element may be one, while in other embodiments, the number can be more than one, and the term "one" cannot be understood as a restriction on the number. The detailed description of the exemplary embodiment is as follows.

The present invention will be further described in detail below with reference to the embodiments of the drawings.

Embodiment 1

Figure 2:
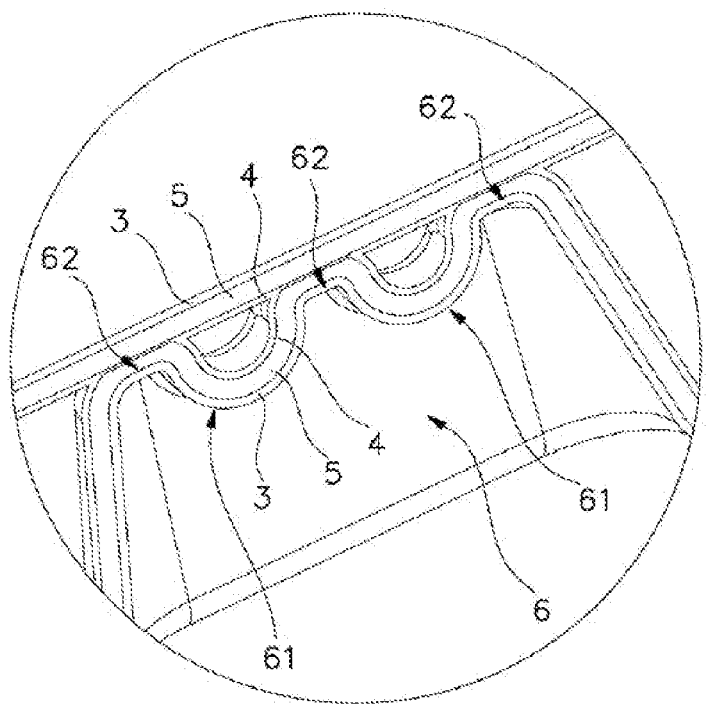
FIG. 2 is an enlarged view of encircled part A in FIG. 1.
Figure 3:
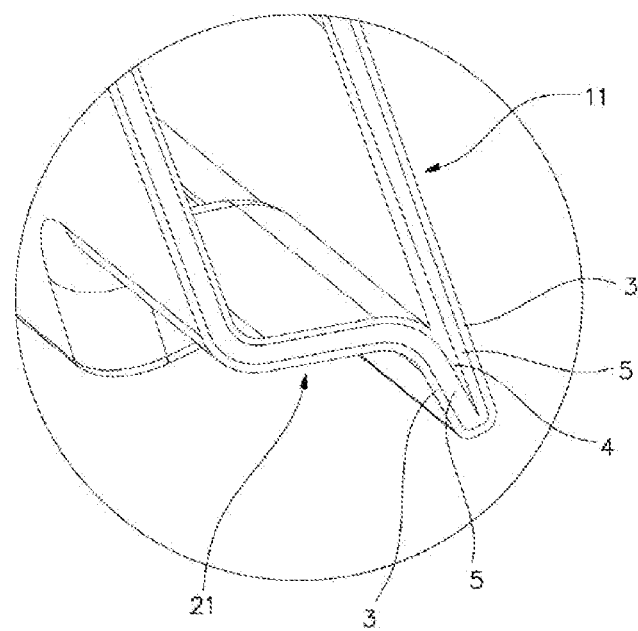
FIG. 3 is an enlarged view encircled part B in FIG. 1.

Referring to FIGS. 1 to 3, according to a preferred embodiment of the present invention, a multilayer hollow fusion panel is illustrated, which includes an upper panel member 1 and a lower panel member 2, wherein the upper panel member 1 and the lower panel member 2 form a hollow structure by blow molding.

Each of the upper panel member 1 and the lower panel member 2 according to the preferred embodiment has a three-layer structure that each includes an outer layer 3, an intermediate layer 5, and an inner layer 4. Also, the lower panel member 2 is facing upwards, that is in the direction toward the upper panel member 1, and is recessed until the inner layer 4 of the lower panel member 2 being fused with the inner layer 4 of the upper panel member 1 to form a predetermined number of joint supporting structures 6 distributed in a predetermined manner.

An edge structure of the multi-layer hollow fusion panel is as follows. As shown in FIG. 3, the upper panel member 1 further comprises an outer bending wall 11 being surroundingly bent downwardly at an outer edge of the upper panel member 1. The lower panel member 2 has an inner bending wall 21 being surroundingly bent downwardly at an outer edge of the lower panel member 2. A bottom of the inner layer 4 of the outer bending wall 11 and a bottom of the inner layer 4 of the inner bending wall 21 are fused and integrated with each other to form an integral body of the multi-layer hollow fusion panel.

According to the preferred embodiment, each of the joint supporting structures 6, having a sinusoidal waveform and a recessed cavity therein, is configured to have an elongated shape or strip shape. As shown in FIGS. 1 and 2, correspondingly, each of the joint supporting structures 6 further has three contact peak points 62 which are arranged spacedly and alternatingly with the reinforcing ribs 61 in intervals.

For the raw material structure of the double-outer single-inner three-layer multi-layer hollow fusion panel: the outer layers 3 of the upper panel member 1 and the lower panel member 2 are both made of high density polyethylene. The intermediate layers 5 of the upper panel member 1 and the lower panel member 2 are made of a mixture selected from high density polyethylene and calcium carbonate or a mixture of high density polyethylene and glass fiber. The inner layers 4 of the upper panel member 1 and the lower panel member 2 are made of metallocene polyethylene.

As a result, the outer layer 3 has the properties of high surface strength, scratch resistance, and oil resistance. The inner layer 4 has a low thermoplastic shrinkage ratio and provides rigid frame structure support. The intermediate layer 5 has a predetermined elasticity and energy absorption and high strength, and provides an effective buffering effect to any impact and drop which may damage the panel.

According to the preferred embodiment of the present invention, when the intermediate layer 5 is made of a mixture of high density polyethylene and calcium carbonate, the mass percentage of high density polyethylene is 70% to 85%, and the mass percentage of calcium carbonate is 15% to 30%.

According to the preferred embodiment of the present invention, when the intermediate layer 5 is made of high density polyethylene and glass fiber, the mass percentage of high density polyethylene is 60% to 85%, and the mass percentage of glass fiber is 15% to 40%.

According to the preferred embodiment, each of the upper panel member 1 and the lower panel member 2 of the multi-layer multi-layer hollow fusion panel is configured to have the above-mentioned double-outer single-inner three-layer structure, so that when the outer layer 3 is strongly impacted and dropped, the inner layer 4 can actively even break to absorb the energy, and that since the material of the intermediate layer 5 has a resilience tension, the inner layer 4 can still be reset to its original position so as to ensure the integrity and function of the entire panel. Therefore, the hollow composite panel of the present invention has the advantages of high surface strength, high flatness, overall impact resistance, deformation resistance, more stable structure, higher performance, and longer service life.

The multi-panel multi-layer hollow fusion panel can be applied to many different applications. For example, it can be applied to tables and chairs, such as tabletop panels, seat panels and back panels of chairs, and etc. It can also be applied to other products where the panel is easy to break. It can also be applied to construction materials such as wall partitions, wall panels, door panels, fence panels, outdoor floors, insulation panels, and partition panels.

According to the preferred embodiment of the present invention, the parameters of the high density polyethylene used in the outer layer 3 are as follows: melting fat: 1.5 g/10 min, bending strength: 900 MPa, Shore D69.

According to the preferred embodiment of the present invention, the parameters of the high density polyethylene used in the intermediate layer 5 are as follows: melting fat: 0.35 g/10 min, bending strength: 1050 MPa, Shore D63.

According to the preferred embodiment of the present invention, the parameters of the metallocene polyethylene used in the inner layer 4 are as follows:

Melting fat: 2.0 g/10 min;

Elongation at break: 420% in longitudinal direction and 830% in transverse direction;

Tensile strength at break: 62 MPa in longitudinal direction, 25 MPa in transverse direction;

Dart impact strength<48 g;

Eikmandorf tearing strength: 21° C. in longitudinal direction, 430° C. in transverse direction.

Furthermore, a person who skilled in the art should understand that, as an example of a simplified application, the outer layer, the intermediate layer and the inner layer can be made of the same material, or the material with different grades or different levels. For example, the outer layer, the intermediate layer and the inner layer can be made of high density polyethylene. In addition, the outer layer can be made of material having high hardness level and bright color, the intermediate layer can be a composite layer, and the inner layer can be made of recycled materials and a predetermined proportion of structural filling materials. These configurations can save the material cost and allow quick color changing capability.

Embodiment 2

Figure 4:
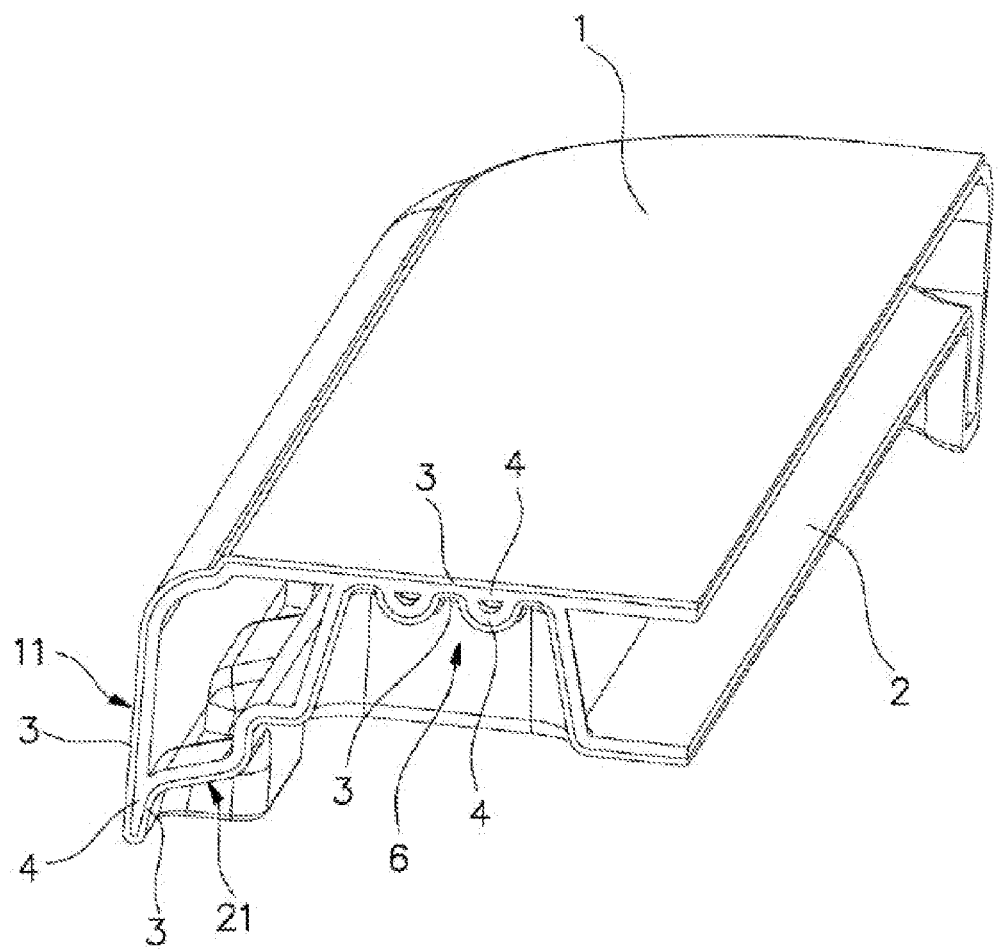
FIG. 4 is a partial sectional perspective view an alternative mode of the above preferred embodiment of the present invention.
Figure 5A:
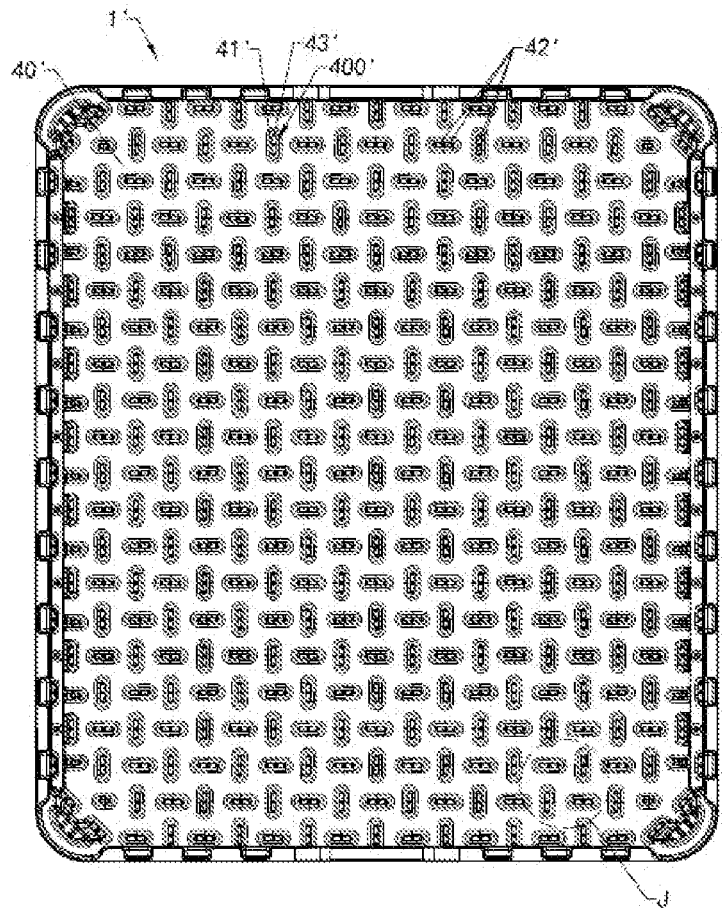
FIG. 5A is a schematic view of a hollow fusion panel according to the above preferred embodiment of the present invention.
Figure 5B:
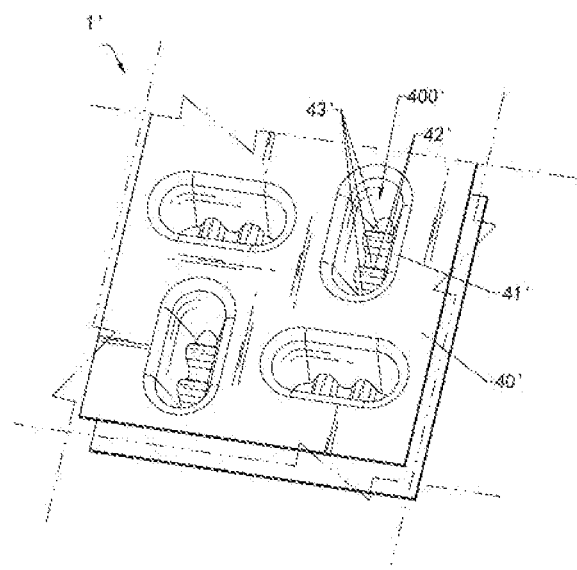
FIG. 5B is an enlarged top perspective view, illustrating the encircled part J of FIG. 5A, of the hollow fusion panel according to the above preferred embodiment of the present invention.
Figure 5C:
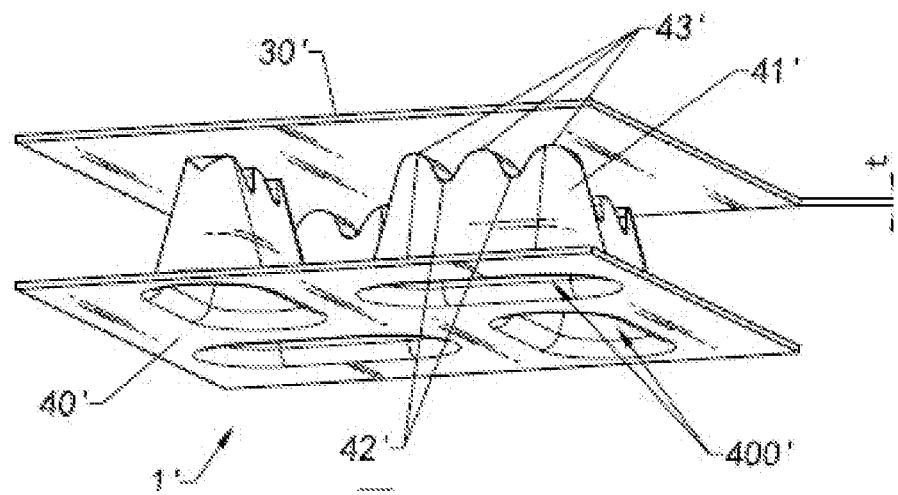
FIG. 5C is an enlarged bottom perspective view, illustrating the encircled part J of FIG. 5A, of the hollow fusion panel according to the above preferred embodiment of the present invention.
Figure 5D:
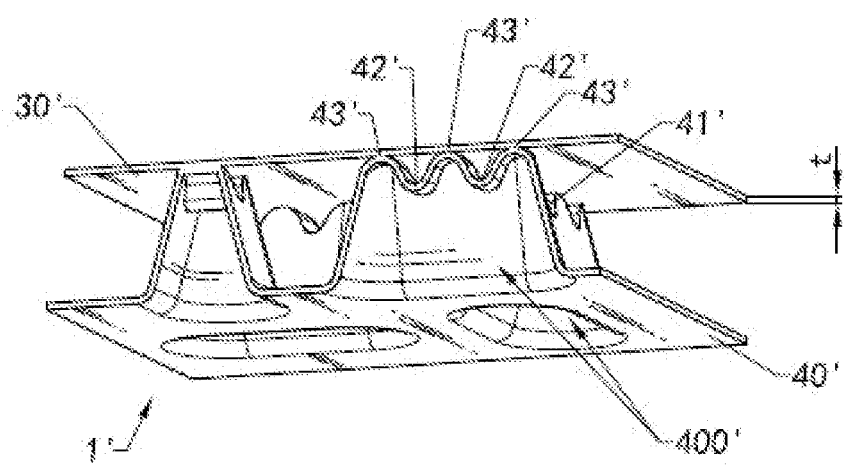
FIG. 5D is an enlarged sectional perspective view, illustrating the encircled part J of FIG. 5A, of the hollow fusion panel according to the above preferred embodiment of the present invention.
Figure 6A:
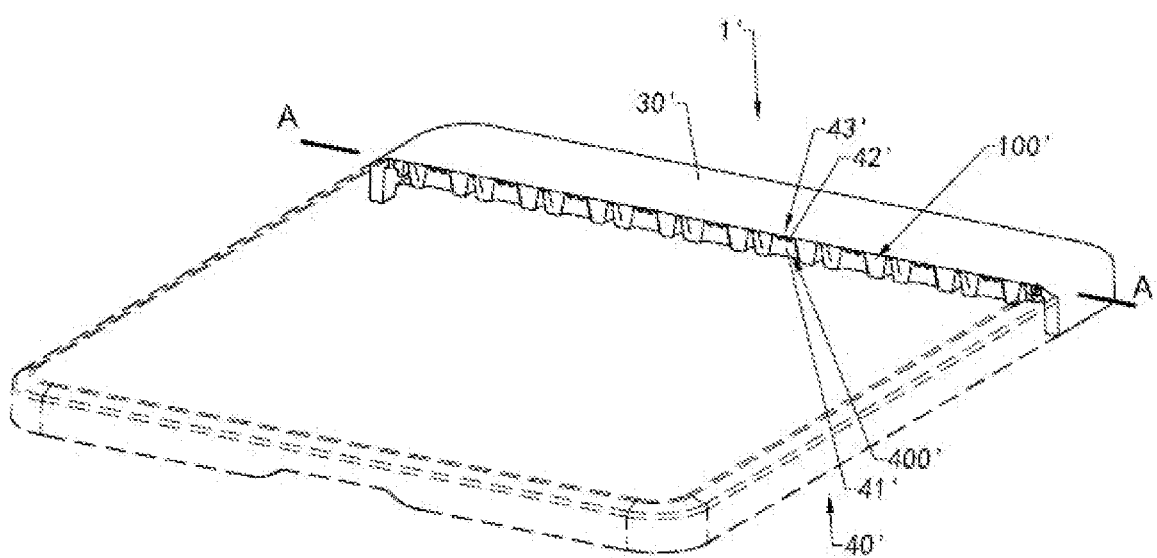
FIG. 6A is a sectional perspective view of the hollow fusion panel, viewing from another direction, according to the above preferred embodiment of the present invention from another perspective.
Figure 6B:
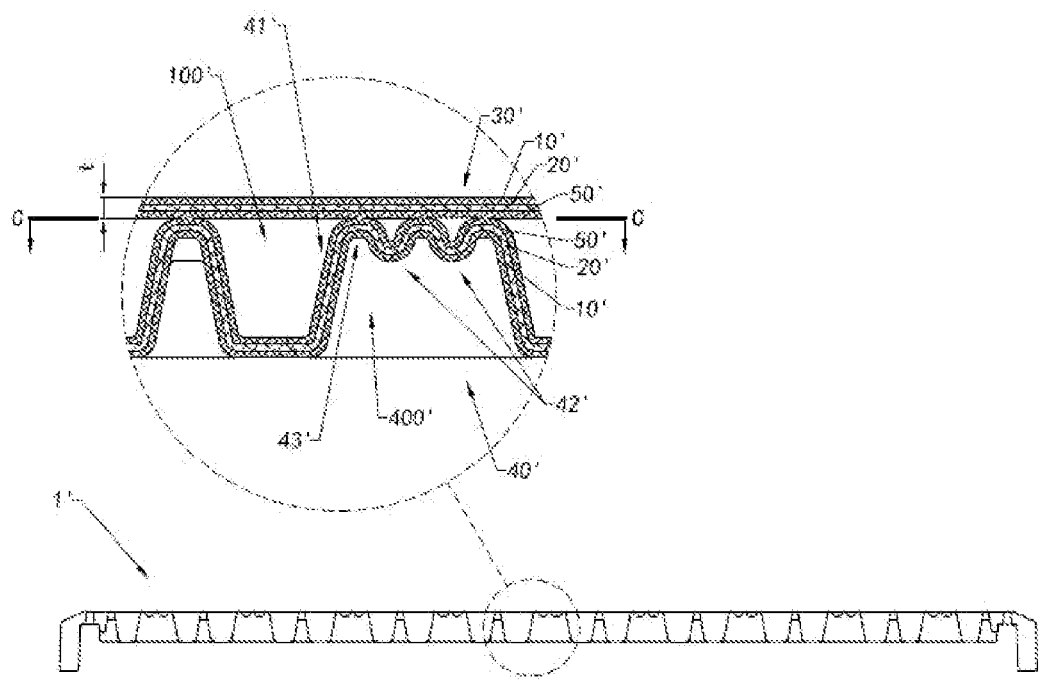
FIG. 6B illustrates a schematic view and an enlarged partial sectional view thereof, along the line A-A in FIG. 6A, of the hollow fusion panel according to the above preferred embodiment of the present invention.
Figure 6C:
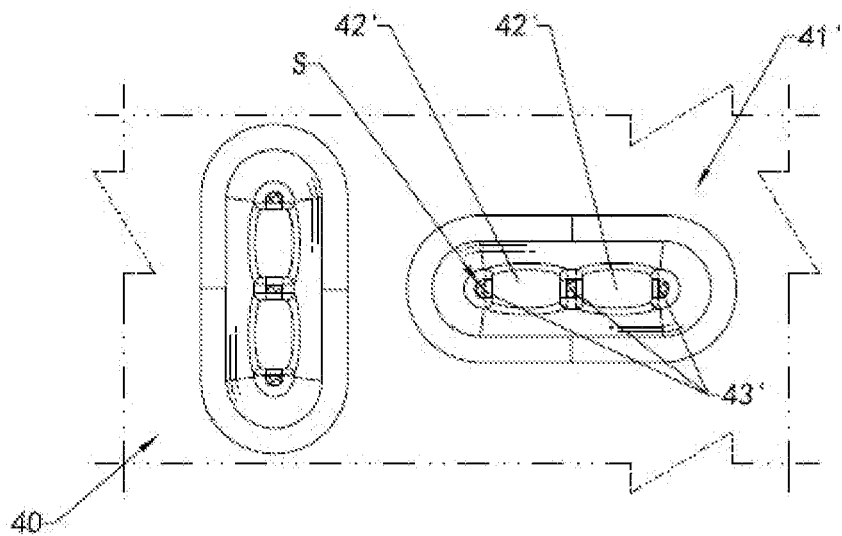
FIG. 6C is a partial enlarged plan view, along the line C-C in FIG. 6B, of the hollow fusion panel according to the above preferred embodiment of the present invention taken.

As shown in FIG. 4, an alternative mode of the preferred embodiment of the present invention is illustrated. According to this alternative mode, the upper panel member 1 and the lower panel member 2 each having a double-layer structure. In other words, each of the upper panel member 1 and the lower panel member 2 includes an outer layer 3 and an inner layer 4, wherein the lower panel member 2 is recessed in a direction toward the upper panel member 1 until the inner layer of the lower panel member and the inner layer of the upper panel member 1 are fused with each other to form a predetermined number of joint supporting structures 6 distributed in a predetermined manner.

The raw material structure of the double-layer multi-layer hollow fusion panel is as follows: the outer layers 3 of the upper panel member 1 and the lower panel member 2 are both made of high density polyethylene, and the inner layers 4 of the upper panel member 1 and the lower panel member 2 are made of a mixture selected from high density polyethylene, metallocene polyethylene and calcium carbonate, or both made of a mixture of high-density polyethylene, metallocene polyethylene and glass fiber.

According to the this alternative mode of the preferred embodiment of the present invention, for the inner layer 4, the mass percentage of the metallocene polyethylene is 10% to 15%, the mass percentage of calcium carbonate is 15% to 20%, and the rest is high density polyethylene. Alternatively, for the inner layer 4, the mass percentage of the metallocene polyethylene is 10% to 15%, the mass percentage of the glass fiber is 15% to 25%, and the rest is high density polyethylene.

In addition, the parameter performance of the high density polyethylene and metallocene polyethylene used in this embodiment can refer to the above embodiment 1, which will not be further described here.

The above descriptions are for the preferred embodiments of the present invention. It should be pointed out that for a person who skilled in the art, without departing from the principle of the present invention, various modifications or improvements can be made to the present invention. For example, the outer layer, the intermediate layer, and the inner layer of the upper layer member and the outer layer, the intermediate layer, and the inner layer of the lower layer member can be configured to have more than one layer structure, which should be within the scope of the present invention.

Referring to FIGS. 5A to 6C, according to the preferred embodiment of the present invention, a hollow fusion panel 1' is illustrated.

The hollow fusion panel 1' can be constructed as a panel having a relatively thinner thickness with excellent performance. The hollow fusion panel 1' may include a first panel member 30' and a second panel member 40', wherein at least a portion of the first panel member 30' and at least a portion of the second panel member 40' is configured to maintain a predetermined distance to define at least one cavity 100' therebetween and surroundingly form a hollow panel structure.

A plurality portions of the second panel member 40' is extended toward the first panel member 30' to form a predetermined number of supporting structures 41' arranged in predetermined patterns, wherein the supporting structures 41' are respectively extended to the first panel member 30' until being fused with the first panel member 30' during thermal blow molding.

At least portions of the second panel member 40' are stretched and recessed towards the first panel member 30' to form the supporting structures 41'. In other words, without increasing the overall weight of the hollow fusion panel 1', the supporting structures 41' are formed with respect to the first panel member 30' to provide supporting effect so as to enhance the overall strength of the entire hollow fusion panel 1'.

In addition, since the second panel member 40' is stretched and recessed to form the supporting structures 41', at least some portions of the second panel member 40' can be thinner in thickness, so that the thickness of the entire hollow fusion panel 1' can be reduced. In other words, comparing with the conventional blow-molded panels, the hollow fusion panel 1' of the present invention can provide better structural strength while having a thinner thickness.

Further, since the second panel member 40' has the supporting structures 41' formed and extended to the first panel member 30' and the inner side of the first panel member 30' and at least portions of the second panel member 40' are fused with each other, during the using of the hollow fusion panel 1', the overall impact resistance of the entire hollow fusion panel 1' is improved accordingly while subjected to an external collision or impact due to the mutual contact and fusion between the first panel member 30' and the second panel member 40'.

Due to the fusion of the supporting structures 41' and the first panel member 30', the thickness of the fusion positions where the supporting structures 41' fuse and connect with the first panel member 30' can be reduced that facilitates heat dissipation at these positions. In detail, if the second panel member 40' forms the supporting structures 41' that extend to only attach to the first panel member 30', then the thickness at each attaching position of the first panel member 30' and the second panel member 40' is equal to the sum of the thickness of the first panel member 30' and the second panel member 40' at the corresponding attaching position. For the first panel member 30', since the thickness at each of the attaching positions is greater than that of other adjacent positions, heat may accumulate in these attaching positions during the manufacturing process, that will affect the quality of the final product, such as uneven shrinkage problem caused by uneven heat dissipation.

However, the fusion of the supporting structure 41' and the first panel member 30' can improve the above problem. By means of the fusion of the supporting structures 41' of the second panel member 40' and the first panel member 30', the material of the second panel member 40' forming the supporting structures 41' merges into the first panel member 30', and the material of the first panel member 30' merges into the supporting structures 41'. It is understood that gaps between the materials forming the first panel member 30' and the supporting structures 41' of the second panel member 40' are eliminated due to the mutual fusion of the supporting structures 41' and the first panel member 30', so that the thickness of each of the fusion positions of the first panel member 30' and the supporting structures 41' would be less than the sum of the thickness of the first panel member 30' and the thickness of the supporting structure before fusion, such that the heat dissipation problem can thus be improved.

In addition, due to the mutual fusion of materials, the structure between the supporting structure 41' and the first panel member 30' is more tight and rigid.

Furthermore, the hollow fusion panel 1' is configured as a multilayer structure. However, in the conventional art, the entire plastic panel is usually made of the same material while being required to achieve the desired structural strength, scratch resistance, impact resistance, and etc. A high performance plastic panel needs to achieve a variety of excellent performance through the same material, which undoubtedly requires the material itself to have higher requirements, so that it is often necessary to use more expensive modified materials, or that it is often necessary to redesign the structure of the plastic panel, expecting to obtain panels with excellent performance through structural improvements other than the materials.

In the preferred embodiment, the hollow fusion panel 1' is designed as a multilayer structure, so different materials can be used to composite and meet different performance requirements, thereby lowering the demands and requirements of the materials to be used as a whole.

In detail, in this embodiment, the hollow fusion panel 1' may include a first layer 10' and a second layer 20', wherein the first layer 10' and at least a portion of the second layer 20' are overlapped and composited. The first panel member 30' may include one or two selected from a combination of a portion of the first layer 10' and at least a portion of the second layer 20', and the second panel member 40' may include one or two selected from a combination of other at least a portion of the first layer 10' and the other portion of the second layer 20'.

The hollow fusion panel 1' can be implemented as that the first panel member 30' includes at least a portion of the first layer 10', and the second panel member 40' includes at least the other portion of the first layer 10' and the entire second layer 20'.

The hollow fusion panel 1' can also be implemented as that the first panel member 30' includes at least a portion of the first layer 10' and the entire second layer 20', and the second panel member 40' includes at least the other portion of the first layer 10'.

The hollow fusion panel 1' can also be implemented as that the first panel member 30' includes at least a portion of the first layer 10' and at least a portion of the second layer 20', and the second panel member 40' includes at least the other portion of the first layer 10' and at least the other portion of the second layer 20'. In this embodiment, the first layer 10' and the second layer 20' are overlapped and composited to form both the first panel member 30' and the second panel member 40'.

It is worth mentioning that the term "layer" in the disclosure does not refer that the first layer 10' or the second layer 20' must have an apparent boundary therebetween. The first layer 10' and the second layer 20' can be made of the same material, and the connecting boundary between the first layer 10' and the second layer 20' can be obvious or can also be blurred, such as a fusion, bonding, superimposed, or laminated integral composite structure. The first layer 10' and the second layer 20' may also be made of different materials. In particular, the first panel member 30' includes at least portion of the first layer 10' and at least portion of the second layer 20', wherein at least portions of the first layer 10' and the second layer 20' can be overlapped and composited with each other to form the first panel member 30'.

In the preferred embodiment, the first layer 10' and the second layer 20' are fused with each other at the overlapping junction thereof as an example for description.

Further, in this embodiment, the first layer 10' and the second layer 20' of the hollow fusion panel 1' are both arranged to be continuous layers, and the first layer 10' and the second layer 20' are completely overlapped. The first layer 10' is an outer layer located outside and the second layer 20' is an inner layer located inside. The second layer 20' surrounds to define the cavity 100' and the first layer 10' is arranged around the second layer 20'.

Further, the hollow fusion panel 1' may further include a third layer 30', wherein the second layer 20' is located between the first layer 10' and the third layer 30', wherein the third layers 30' and at least portion of the second layer 20' are overlapped and fused with each other.

The first panel member 30' may include one or more selected from a combination of at least portion of the first layer 10', at least portion of the second layer 20', and at least portion of the third layer 30'. The second panel member 40' may include one or more selected from a combination of at least the other portion of the first layer 10', at least the other portion of the second layer 20', and at least the other portion of the third layer 30'.

Figure 7A:
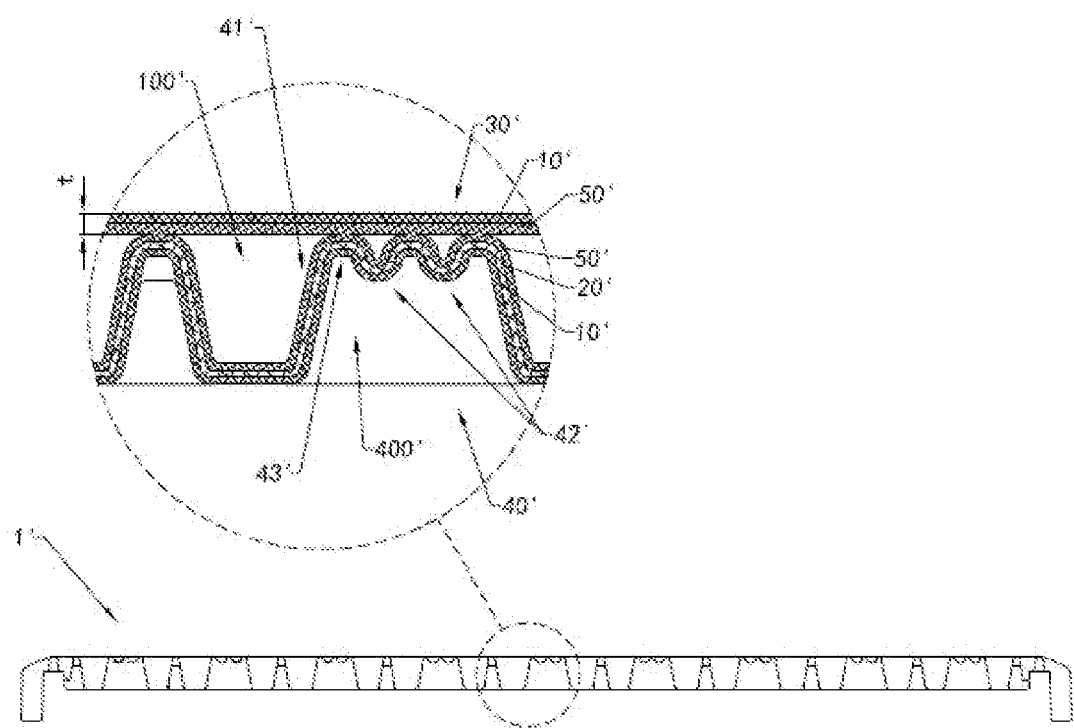
FIG. 7A illustrates a schematic view and an enlarged partial sectional view thereof of a hollow fusion panel according to another alternative mode of the above preferred embodiment of the present invention.
Figure 7B:
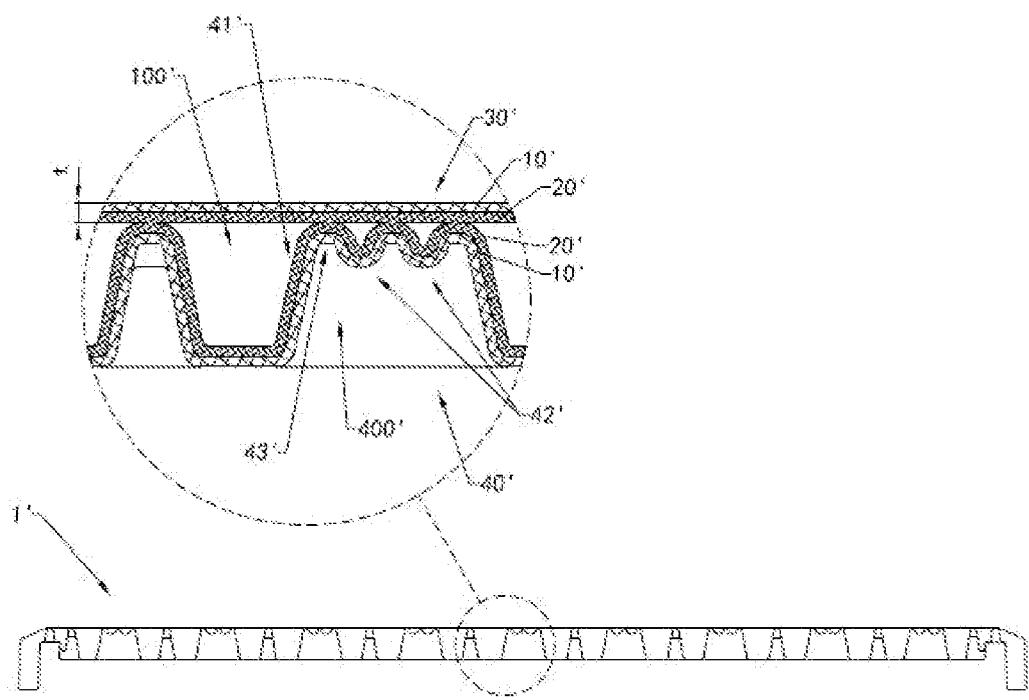
FIG. 7B illustrates a schematic view and an enlarged partial sectional view thereof of a hollow fusion panel according to another alternative mode of the above preferred embodiment of the present invention.
Figure 7C:
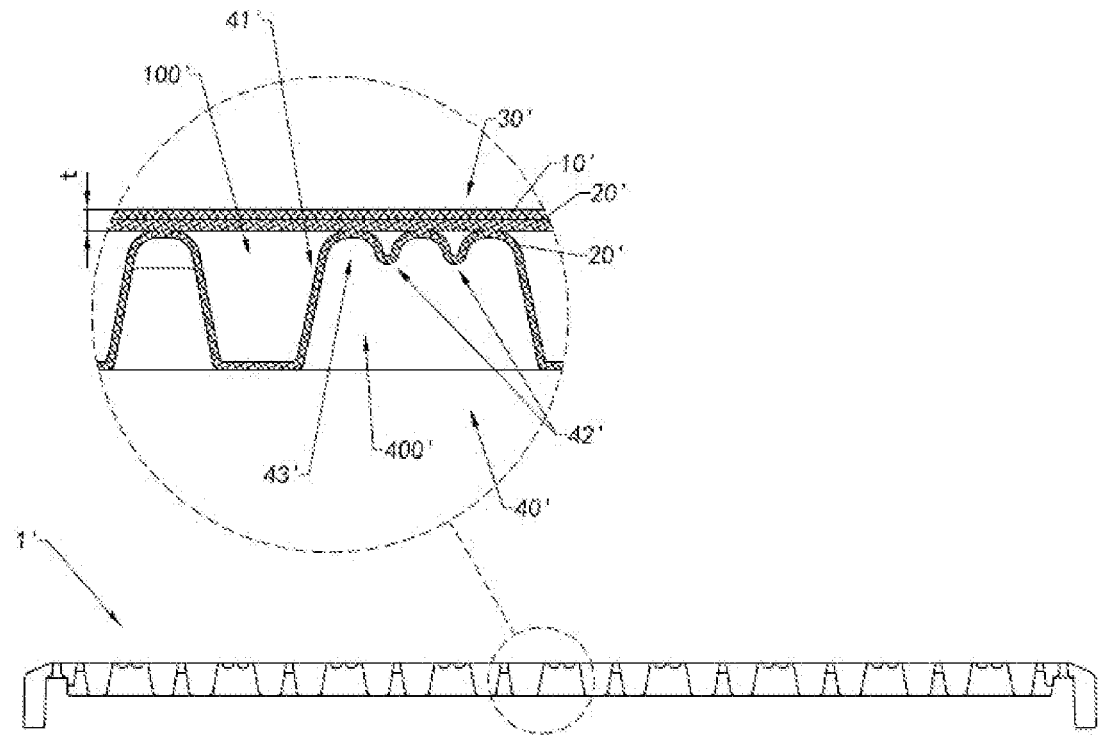
FIG. 7C illustrates a schematic view and an enlarged partial sectional view thereof of a hollow fusion panel according to another alternative mode of the above preferred embodiment of the present invention.

It is understandable that the first panel member 30' can be a single-layer, double-layer, triple-layer, or multi-layer structure, and the second panel member 40' can also be a single-layer, double-layer, triple-layer, or multi-layer structure, for example, referring to FIGS. 7A to 7C.

In this embodiment, the first panel member 30' includes at least portion of the first layer 10', at least portion of the second layer 20', and at least portion of the third layer 30'. The second panel member 40' includes at least the other portion of the first layer 10', at least the other portion of the second layer 20', and at least the other portion of the third layer 30'. An inner wall of the third layer 30' defines the cavity 100'.

The supporting structure 41' may each includes one or more selected from a combination of at least portion of the first layer 10', at least portion of the second layer 20' and at least portion of the third layer 30'. It can be understood that the number of layers of the supporting structure 41' and other portion of the second panel member 40' may be the same or may be different. In this embodiment, the supporting structures 41' each includes at least portion of the first layer 10', at least portion of the second layer 20' and at least portion of the third layer 30'. In other words, the first layer 10', the second layer 20', and the third layer 30' of the second panel member 40' extend inwardly at predetermined positions to form the predetermined number of supporting structures 41' respectively.

The first layer 10' of the hollow fusion panel 1' is configured to have an excellent first performance, the second layer 20' is configured to have an excellent second performance, and the third layer 30' is configured to have excellent third performance. While the first layer 10' has the excellent first performance, the requirements of the second performance and the third performance can be lowered. While the second layer 20' has the excellent second performance, the requirements of the first performance and the third performance can be lowered. While the third layer 30' has the excellent third performance, the requirements of the first performance and the second performance can be lowered.

Accordingly, the hollow fusion panel 1' including the first layer 10', the second layer 20' and the third layer 30' finally has the excellent first performance, second performance and third performance overall, but does not need to rely on any material that meets the requirements of the first performance, the second performance and the third performance at the same time.

The layers of the hollow fusion panel 1' are designed to have different performances. For example, the first layer 10' is designed to be scratch-resistant and has better scratch-resistant performance than the second layer 20' and the third layer 30'. For example, the second layer 20' is designed to be impact resistant and has better impact resistance performance than the first layer 10' and the third layer 30'. For example, the third layers 30' is designed to have better supporting strength and has better supporting strength performance than the first layer 10' and the second layer 20'.

Optionally, the first layer 10' may be made of high density polyethylene, the second layer 20' may be made of high density polyethylene plus calcium carbonate or high density polyethylene plus glass fiber, and the third layer 30' may be made of metallocene polyethylene.

When the first layer 10' of the hollow fusion panel 1' is made of high density polyethylene, the relative parameters of the high density polyethylene may be melting fat: 1.5 g/10 min, bending strength: 900 MPa, and Shore D69.

When the second layer 20' of the hollow fusion panel 1' is made of high density polyethylene plus calcium carbonate, the mass percentage of calcium carbonate can be 15% to 30%, and the mass percentage of high density polyethylene can be 70% to 85%. In addition, the relative parameters of the high density polyethylene can be melting fat: 0.35 g/10 min, bending strength 1050 MPa, Shore D63.

When the second layer 20' of the hollow fusion panel 1' is made of high-density polyethylene and glass fiber, the mass percentage of glass fiber can be 15% to 40%, and the mass percentage of high density polyethylene can be 60% to 85%. Also, the relative parameters of high density polyethylene can be melting fat: 0.35 g/10 min, bending strength 1050 MPa, Shore D63.

When the third layer 30' of the hollow fusion panel 1' is made of metallocene polyethylene, the relative parameters of the metallocene polyethylene can be melting fat: 2.0 g/10 min, elongation at break: 420% in longitudinal direction, 830% in transverse direction, tensile strength at break: 62 MPa in longitudinal direction, 25 MPa in transverse direction, dart impact strength<48 g, Eikmandorf tear strength: 21° C. in longitudinal direction, 430° C. in transverse direction.

Further, the first panel member 30' and a portion of each of the supporting structures recessed from the second panel member 40' can be fused with each other for producing more beneficial effects. In particular, in this embodiment, portions of the third layer 30' of the first panel member 30' and portions of the third layer 30' of the supporting structures 41' are fused with each other. It is worth mentioning that the fusion of the first panel member 30' and the second panel member 40' does not necessarily require that the materials of the two fusing positions of the first panel member 30' and the second panel member 40' be the same before the fusion, wherein person skilled in the art is capable of selecting suitable materials according to requirements.

Before the first panel member 30' and the second panel member 40' where is closed thereto are fused with each other, the largest thickness of the hollow fusion panel 1' is the contact position where the supporting structure contacting the first panel member 30', that is such maximum thickness is the sum of a total thickness of the first layer 10', the second layer 20', and the third layer 30' of the first panel member 30', and at total thickness of the first layer 10', the second layer 20', and the third layer 30' of the second panel member 40'.

After the first panel member 30' and the second panel member 40' are fused with each other, for example, two opposing third layers 30' of the first panel member 30' and the supporting structure 41' of the second panel member 40' are at least partially fused with each other, wherein a maximum thickness of the hollow fusion panel 1' is less than the sum of the thickness of the first panel member 30' and the thickness of the second panel member 40', and is greater than or equal to a total thickness of partial thickness of the first layer 10', partial thickness of the second layer 20', and partial thickness of the third layer 30' of the first panel member 30' plus partial thickness of the first layer 10' and partial thickness the second layer 20' of the second panel member 40'. The reason is that the third layer 30' part of the second panel member 40' may be completely fused with the third layer 30' part of the first panel member 30'.

Accordingly, a thickness of the maximum thickness position of the hollow fusion panel 1' can be decreased, thereby facilitating heat dissipation thereat.

In addition, since the second layer 20' and the third layer 30' can be made of different materials, the fusion of the first panel member 30' and the supporting structure 41' may render the heat dissipation of portions of the third layer 30' of the first panel member 30' at those fusing positions being more difficult than that of before fusion with the supporting structure 41', which may lead to different shrinkage rates at various positions of the third layer 30' of the first panel member 30', which may further affect the corresponding portions of the second layer 20' and the first layer 10' of the first panel member 30', resulting in uneven surface of the first panel member 30'. However, due to the multi-layer configuration of the first panel member 30', the heat transfer efficiency and shrinkage rates of the first layer 10', the second layer 20' and the third layer 30' may be different. The heat dissipation may have a certain influence on the third layer 30', but this influence can be compensated or reduced as much as possible by selecting the right material to be used for the first layer 10' or the second layer 20'.

Further, in the conventional art, relevant technicians would generally try to avoid any contact between the second panel member 40' and the first panel member 30' which are made of the same material as to reduce the defective rate of the product. Therefore, under the framework of the conventional art, it is necessary to arrange as many supporting structures 41' as possible for supporting the first panel member 30' as much as possible under the premise of smaller contact area. In the preferred embodiment, since the supporting structures 41' can each maintain a certain contact area with the first panel member 30', it is beneficial to the structural strength of the hollow fusion panel 1' of the present invention while without affecting the product yield thereof. Accordingly, the number of the supporting structures 41' does not need to be arranged as much as the conventional art does. In other words, the total number of the supporting structures 41' can be reduced and the distance between the adjacent supporting structures 41' can be reasonably enlarged to facilitate manufacturing, such as to facilitate demolding, and also to reduce the possibility of collateral influence of the adjacent supporting structures 41' during the manufacturing process.

Further, in the conventional art, relevant technicians would try to avoid any contact between the second panel member 40' and the first panel member 30' to reduce product defective rate, especially when the first panel member 30' is made thinner, wherein the increasing of the thickness at the inner side of the first panel member 30' would cause adverse effect in heat dissipation for the first panel member 30'. Therefore, the thinner the panel thickness, the smaller the contact area between the first panel member 30' and the second panel member 40'. However, in this embodiment, larger contact area between the first panel member 30' and the second panel member 40' can be arranged, especially when a thinner first panel member 30' is used, that is beneficial, on the one hand, to the support of the first panel member 30', and on the other hand, to the firmness and rigidness of the integration of the first panel member 30' and the second panel member 40'. In the conventional art, the contact area of the first panel member 30' and the second panel member 40' should be arranged as little as possible, or even have to avoid any contact of the first panel member 30' and the second panel member 40' other than the edge connection position of the first panel member 30' and the second panel member 40'. In this embodiment, the total contact area of the supporting structures 41' of the first panel member 30' and the second panel member 40' is relatively larger. When the first panel member 30' is impacted, the impact force applied thereon can be quickly transmitted to the second panel member 40', while the cavity 100' formed between the first panel member 30' and the second panel member 40' can serve as a buffer and provide shock absorption effect.

According to one embodiment of the present invention, the thickness of the first panel member 30' of the hollow fusion panel 1' may be referred as t, and this value would be an average thickness of the first panel member 30'. The contact area between the first panel member 30' of the hollow fusion panel 1' and the corresponding supporting structure 41' at this fusing position is referred as s, and this value may be a mean value of the contact area between the plurality of supporting structures 41' and the first panel member 30'. The ratio of the thickness of the first panel member 30' of the hollow fusion panel 1' to the contact area is $x=s/t^2$. According to one embodiment of the present invention, t may be 2 mm and s may be 0.5 mm2. x is 0.5/4=0.125. According to one embodiment of the present invention, x may be greater than 0.1.

According to one embodiment of the present invention, the thickness of the first panel member 30' of the hollow fusion panel 1' may be referred as t, and the area of the first panel member 30' occupied by the corresponding contact peak 43' is referred as s. Then, t can be 3 mm and s can be 6 mm². $x=s/t^2=6/9$, which is greater than 0.1.

Furthermore, each of the supporting structures 41' can form a recessed cavity 400', having a W-shaped cross-section, in a direction toward the first panel member 30'. The recessed cavity 400', having an elongated oval shape, has a bottom portion with two arc-shape end peaks, and is defined by a surrounding peripheral edge wall inclinedly extending upwards and inwards to form the supporting structure 41' for strengthening the second panel member 40'. Each of the supporting structures 41' is provided with at least one reinforcing rib 42'. In this embodiment, each of the supporting structures 41' is provided with a pair of the reinforcing ribs 42', transversally extended across the bottom portion of the recessed cavity 400', that is the relative top portion of the supporting structure 41'. It is worth mentioning that a wave-shaped structure is an ideal reinforcing structure, so the pair of wave-shaped reinforcing ribs 42' also forms the above-mentioned three-peak wave supporting structure 41', which greatly strengthens the impact resistance and robustness of the second panel member 40 '.

The supporting structure 41' can extend toward the first panel member 30' to form at least one contact peak 43', wherein the first panel member 30' fuses with the second panel member 40' at the contact peak 43'. In this example, each of the supporting structures 41' forms three contact peak points 43', such that when the first panel member 30' is impacted, the combining of the contact peaks 43' with the first panel member 30' provide an enforcement effect to the first panel member 30'. Accordingly, the impact force applied to the first panel member 30' is more evenly transmitted to the second panel member 40', while the first panel member 30' and the cavity 100' formed on the second panel member 40' can provide buffering and shock absorbing effects.

Further, the hollow fusion panel 1' can be manufactured by blow molding technology, such as extrusion blow molding, injection blow molding and injection stretch blow molding. The melted materials used to manufacture the first layer 10', the second layer 20' and the third layer 30' can be co-extruded through a mold head to form a mold blank in a parison mould, wherein the first layer 10', the second layer 20', and the third layer 30' are fused with each other and define a cavity surrounded by the first layer 10', the second layer 20' and the third layer 30'. The parison mould provides an exterior extrusion pressure to the mold blank and air blow in the mold blank with in the parison mould provides interior extrusion pressure to press the mold blank against the parison mould until the hollow fusion panel 1' is blow-molded from the mold blank. Those skilled in the art can understand that this is one blow molding method selected from various blow molding manufacturing methods for the hollow fusion panel 1'.

During the manufacturing process, portions of the first layer 10', portions of the second layer 20' and portions of the third layer 30' used to form the second panel member 40' are stretched to protrude toward the first panel member 30' to form the supporting structures 41' while the second panel member 40' simultaneously forms the recessed cavities 400' with respect to the supporting structures 41' respectively.

At least a portion of the second panel member 40' is stretched, so the thickness of at least a portion of the second panel member is thinner than the thickness of the first panel member 30'. For example, a thickness of the portion of the first layer 10' forming the supporting structure 41' is generally thinner than that of the portion of the first layer 10' forming the first panel member 30'.

Referring to FIG. 7A, another alternative mode of the hollow fusion panel 1' according to the above preferred embodiment of the present invention is illustrated. In this alternative mode, the first panel member 30' includes at least portion of the first layer 10' and at least portion of the second layer 20', and the second panel member 40' includes at least portion of the first layer 10', at least portion of the second layer 20' and the third layer 30'. In other words, the first panel member 30' is arranged in a two-layer structure and the second panel member 40' is arranged in three-layer structure.

Referring to FIG. 7B, another alternative mode of the hollow fusion panel 1' according to the above-mentioned preferred embodiment of the present invention is illustrated. In this alternative mode, the first panel member 30' includes at least portion of the first layer 10' and at least portion of the second layer 20', and the second panel member 40' includes the other portion of the first layer 10' and the other portion of the second layer 20'. In other words, each the first panel member 30' and the second panel member 40' is arranged in a double-layer structure.

Referring to FIG. 7C, another alternative mode of the hollow fusion panel 1' according to the above preferred embodiment of the present invention is illustrated. In this alternative mode, the first panel member 30' includes the first layer 10' and at least portion of the second layer 20', and the second panel member 40' includes the other portion of the second layer 20'. In other words, the first panel member 30' is arranged in a double-layer structure and the second panel member 40' is arranged in a single-layer structure.

It should be understood by those skilled in the art that the number of layers of the first panel member 30' and the second panel member 40' can be the same or different, and the first panel member 30' and the second panel member 40' can be selectively arranged according to requirements.

Figure 8A:
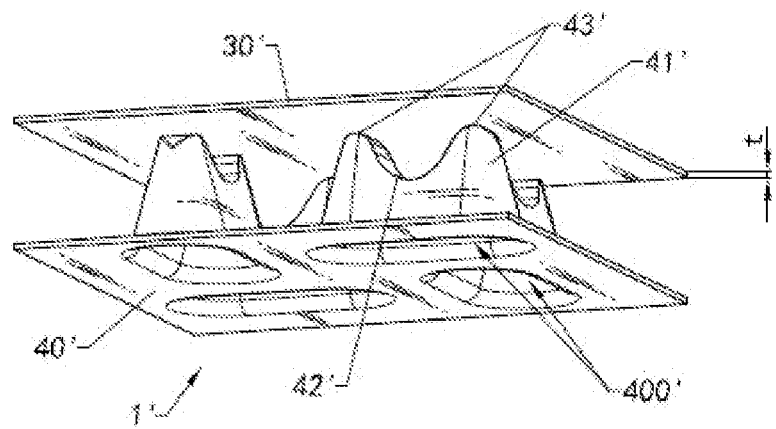
FIG. 8A is a partial perspective view illustrating another alternative mode of the hollow fusion panel according to the above preferred embodiment of the present invention.

Referring to FIG. 8A, it is a partial perspective view of the hollow fusion panel 1' according to another alternative mode of the above preferred embodiment of the present invention.

In this alternative mode, at least one of the supporting structures 41' is formed to have two contact peak points 43' and is arranged with one reinforcing rib 42'.

The contact area between the corresponding supporting structure 41' and the first panel member 30' can be 4*3 mm², and the thickness of the first panel member 30' can be 3 mm, so that x can be 12/9, which is greater than 0.1.

Figure 8B:
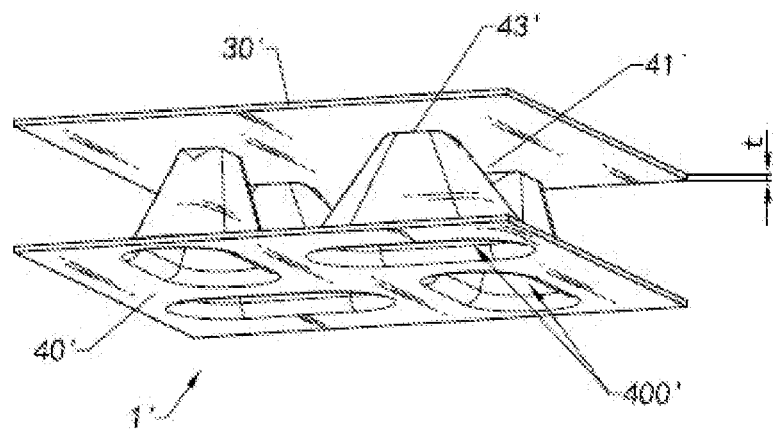
FIG. 8B is a partial perspective view illustrating another alternative mode of the hollow fusion panel according to the above preferred embodiment of the present invention.

Referring to FIG. 8B, it is a partial perspective view of the hollow fusion panel 1' according to another alternative mode of the above preferred embodiment of the present invention.

In this alternative mode, at least one of the supporting structures 41' is formed to have a single contact peak 43'.

The contact area between the single supporting structure 41' and the first panel member 30' may be 4*4 mm², and the thickness of the first panel member 30' can be 4 mm, so that x can be 16/16, which is greater than 0.1.

Figure 9:
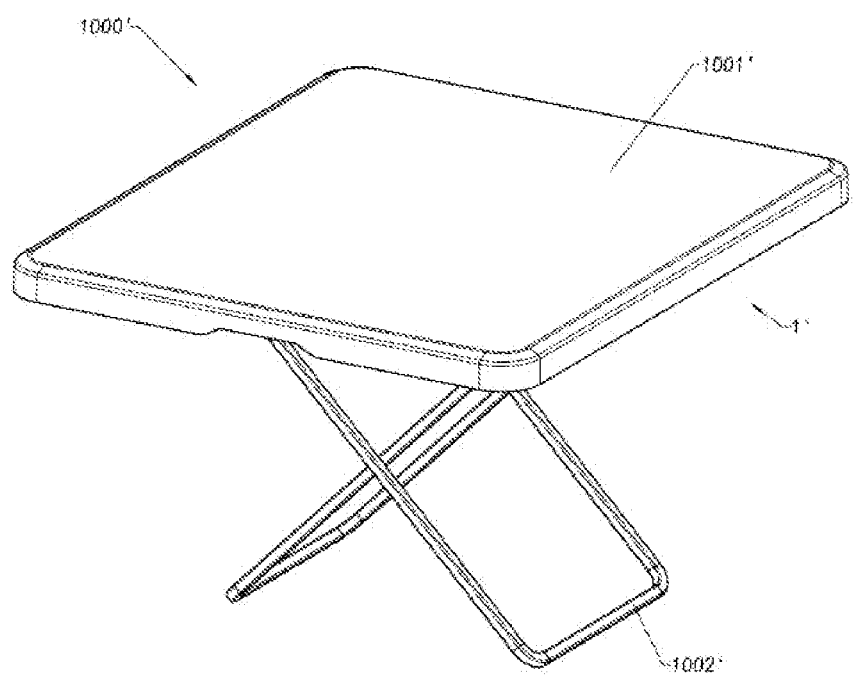
FIG. 9 is a schematic diagram illustrating a table with a top board made of the hollow fusion panel according to the above preferred embodiment of the present invention.

Referring to FIG. 9, it is a perspective view illustrating an application of the hollow fusion panel 1' according to the above preferred embodiment of the present invention.

The hollow fusion panel 1' can be applied to a table 1000'. The table 1000' includes a tabletop 1001' and at least one table leg assembly 1002', wherein the tabletop 1001' is supported on the table leg assembly 1002', wherein table leg assembly 1002' may comprises two or more leg members.

The tabletop panel 1001' can be prepared from a multi-layer panel 1' of the present invention, which can be made into various shapes such as a circle, a rectangle, and etc., to meet different requirements.

At least portion of the first panel member 30' and at least portion of the second panel member 40' of the tabletop panel 1001' are arranged face to face and parallel to each other.

Those skilled in the art should understand that the above description and the embodiments of the present invention shown in the drawings are only examples and do not limit the present invention. The purpose of the present invention has been completely and effectively achieved. The functions and structural principles of the present invention have been shown and explained in the embodiments. Without departing from the principles, the implementation of the present invention may have any deformation or modification.

What is claimed is:

1. A hollow fusion panel, comprising:
   a first layer;
   a second layer;
   a first panel member; and
   a second panel member, wherein at least a portion of said first panel member and at least a portion of the said second panel member are constructed to have a predetermined distance therebetween to define at least one cavity so as to form a hollow integral structure, wherein at least a portion of said first layer and at least a portion of the said second layer are overlapped and composited in such a manner that said first panel member includes at least one portion selected from a combination of said at least a portion of said first layer and at least a portion of the said second layer, and said second panel member includes at least one portion selected from a combination of at least another portion of the said first layer and at least another portion of the said second layer, wherein a plurality portions of the said second panel member is recessed in a direction toward said first panel member to form a predetermined number of supporting structures distributed in a predetermined manner, wherein each of the said predetermined number of supporting structures forms a recessed cavity, wherein each of said predetermined number of supporting structures and said first panel member are at least partially fused with each other, such that at least one area of the said first panel member being fused and occupied by at least one of said predetermined number of supporting structures is s, and a thickness of a position where said first panel member and said second panel member are fused with each other is t, where $s/t^2$ is greater than 0.1.

2. The hollow fusion panel, as recited in claim 1, wherein each of said supporting structures of said second panel member has at least one contact peak point extended in said recessed cavity, wherein said at least one contact peak point is recessed in a direction toward the said first panel member to connect with the said first panel member.

3. The hollow fusion panel, as recited in claim 1, wherein each of said supporting structures is provided with at least one reinforcing rib formed in said recessed cavity of and extended integrally with at least one of said predetermined number of supporting structures.

4. The hollow fusion panel, as recited in claim 3, wherein each of said reinforcing rib has a U-shaped wave-like structure which is formed from at least a portion of at least one of said predetermined number of supporting structures protruded toward said first panel member, wherein said reinforcing rib is extended across a bottom of said recessed cavity to form at least one contact peak point, wherein said at least one contact peak point is recessed toward said first panel member to connect with the said first panel member.

5. The hollow fusion panel, as recited in claim 4, further comprising a third layer, wherein said second layer is formed between said first layer and said third layer, wherein said first layer, said second layer and said third layer are combined to form said first panel member and said second panel member, wherein said first panel member includes at least a portion of said first layer, at least a portion of said second layer and at least a portion of said third layer, and said second panel member includes at least another portion of said first layer, at least the other portion of said second layer, and at least another portion of said third layer.

6. The hollow fusion panel, as recited in claim 5, wherein said first layer is made of a material of a high density polyethylene, and said third layer is made of a material selected from a mixture of high density polyethylene and & calcium carbonate and a mixture of high density polyethylene and a glass fiber, and said second layer is made of a material selected from a mixture of a metallocene polyethylene and calcium carbonate and a mixture of metallocene polyethylene and glass fiber.

7. The hollow fusion panel, as recited in claim 6, wherein said second panel member faces said cavity and extends toward said first panel member to form said at least one contact peak point, wherein said second panel member is recessed toward said first panel member until said third layer of said second panel member and said third layer of said first panel member are fused with each other to form said contact peak point.

8. The hollow fusion panel, as recited in claim 5, wherein said second panel member faces said cavity and extends toward said first panel member to form said at least one contact peak point, wherein said second panel member is recessed toward said first panel member until said third layer of said second panel member is fuses said third layer of said first panel member with each other to form said contact peak point.

9. The hollow fusion panel, as recited in claim 3, wherein said first layer of said first layer panel is an outer layer located outside, wherein a scratch resistance of said first layer is stronger than that of said second layer and a supporting strength of said second layer of said first panel member is stronger than said first layer of said first panel member, wherein said second layer is completely covered by said first layer and an inner wall of said second layer surrounds and defines said cavity.

10. The hollow fusion panel, as recited in claim 1, further comprising a third layer, wherein said second layer is formed between said first layer and said third layer, wherein said first layer, said second layer and said third layer are combined to form said first panel member and said second panel member, wherein said first panel member includes at least a portion of said first layer, at least a portion of said second layer and at least a portion of said third layer, and the said second panel member includes at least another portion of said first layer, at least another portion of said second layer, and at least another portion of said third layer.

11. The hollow fusion panel, as recited in claim 10, wherein said first layer is made of a material of high density polyethylene, and said third layer is made of a material selected from a mixture of high density polyethylene and calcium carbonate and a mixture of high density polyethylene and a glass fiber, and said second layer is made of a material selected from a mixture of a metallocene polyethylene and calcium carbonate and a mixture of metallocene polyethylene and glass fiber.

12. A hollow fusion panel, comprising:
a first layer;
a second layer;
a first panel member; and
a second panel member, wherein at least a portion of the said first panel member and at least a portion of said second panel member are constructed to have a predetermined distance therebetween to form at least one cavity so as to form a hollow integral structure, wherein at least a portion of said first layer and at least a portion of said second layer are overlapped and composited in such a manner that said first panel member includes at least one portion selected from a combination of said at least a portion of said first layer and said at least a portion of said second layer, and said second panel member includes at least one portion selected from a combination of at least another portion of said first layer and at least another portion of said second layer, wherein at least a portion of said second panel member extends toward said cavity to fuse with at least a portion of said first panel member to form at least one contact peak point, wherein an area of the said first panel member being fused and occupied by said at least one contact peak point is s, and a thickness of a position where said first panel member and said second panel member are fused with each other is t, where $s/t^2$ is greater than 0.1.

13. The hollow fusion panel, as recited in claim 12, wherein said first layer of said first layer panel is an outer layer located outside, wherein a scratch resistance of said first layer is stronger than that of said second layer, and a supporting strength of said second layer of said first panel member is stronger than said first layer of said first panel member, wherein said second layer is completely covered by said first layer and an inner wall of said second layer surrounds and defines said cavity.

14. The hollow fusion panel, as recited in claim 12, wherein a plurality portions of said second panel member is recessed in a direction toward said first panel member to form a predetermined number of supporting structures distributed in a predetermined manner, wherein each of said supporting structures forms a recessed cavity therein.

15. The hollow fusion panel, as recited in claim 14, each of said supporting structures is provided with at least one reinforcing rib located in said recessed cavity and extended integrally with said corresponding supporting structure.

16. The hollow fusion panel, as recited in claim 15, wherein each of said reinforcing rib has a U-shaped wave-like structure which is formed from at least a portion of said corresponding supporting structure protruded toward said first panel member, wherein said reinforcing rib is extended across a bottom of said recessed cavity to form at least one contact peak point.

17. The hollow fusion panel, as recited in claim 16, wherein each of said supporting structures is provided with a pair of said reinforcing ribs and forms three said contact peak points.

18. The hollow fusion panel, as recited in claim 15, wherein said first layer of said first layer panel is an outer layer located outside, wherein a scratch resistance of said first layer is stronger than that of said second layer, and a supporting strength of said second layer of said first panel member is stronger than said first layer of said first panel member, wherein said second layer is completely covered by said first layer and an inner wall of said second layer surrounds and defines said cavity.

19. The hollow fusion panel, as recited in claim 12, further comprising a third layer, wherein said second layer is formed between said first layer and said third layer, wherein said first layer, said second layer and said third layer are combined to form said first panel member and said second panel member, wherein said first panel member includes at least a portion of said first layer, at least a portion of said second layer and at least a portion of said third layer, and said second panel member includes at least the other another portion of said first layer, at least the other portion of said second layer, and at least the other another portion of said third layer.

20. The hollow fusion panel, as recited in claim 19, wherein said first layer is made of high density polyethylene, and said third layer is made of a material selected from a mixture of high-density polyethylene and calcium carbonate and a mixture of high-density polyethylene and glass fiber, and said second layer is made of a material selected from a mixture of metallocene polyethylene and calcium carbonate and a mixture of metallocene polyethylene and a glass fiber.

21. The hollow fusion panel, as recited in claim 19, wherein said second panel member faces said cavity and extends toward said first panel member to form said at least one contact peak point, wherein said second panel member is recessed in a direction toward said first panel member until said third layer of said second panel member and said third layer of said first panel member are fused with each other to form said contact peak point.

* * * * *